(12) United States Patent
Wildish et al.

(10) Patent No.: US 7,383,434 B2
(45) Date of Patent: Jun. 3, 2008

(54) SYSTEM AND METHOD OF LOOKING UP AND VALIDATING A DIGITAL CERTIFICATE IN ONE PASS

(75) Inventors: Michael Andrew Wildish, Scarborough (CA); Stephen M. Ansell, Newmarket (CA); Michael C. Crerar, Toronto (CA)

(73) Assignee: Diversinet Corp., Toronto, Ontario (CA)

( * ) Notice: Subject to any disclaimer, the term of this patent is extended or adjusted under 35 U.S.C. 154(b) by 733 days.

(21) Appl. No.: 10/376,249

(22) Filed: Mar. 3, 2003
(Under 37 CFR 1.47)

(65) Prior Publication Data

US 2003/0212888 A1    Nov. 13, 2003

(30) Foreign Application Priority Data

Mar. 1, 2002   (CA) .................................... 2374195

(51) Int. Cl.
*H04L 9/00* (2006.01)
*G06F 15/16* (2006.01)
*G06F 17/30* (2006.01)
*G06F 7/04* (2006.01)
*G06K 19/00* (2006.01)
*G06K 9/00* (2006.01)

(52) U.S. Cl. .................. 713/157; 713/156; 713/175; 726/6; 726/10; 380/282

(58) Field of Classification Search ............. 713/156, 713/157, 175; 726/6, 10; 380/282
See application file for complete search history.

(56) References Cited

U.S. PATENT DOCUMENTS

| | | | | |
|---|---|---|---|---|
| 5,745,574 A | * | 4/1998 | Muftic | 713/157 |
| 6,088,717 A | * | 7/2000 | Reed et al. | 709/201 |
| 6,092,202 A | * | 7/2000 | Veil et al. | 726/27 |
| 6,321,333 B1 | * | 11/2001 | Murray | 713/156 |
| 6,701,415 B1 | * | 3/2004 | Hendren, III | 711/138 |
| 2001/0011255 A1 | * | 8/2001 | Asay et al. | 705/76 |
| 2002/0053023 A1 | * | 5/2002 | Patterson et al. | 713/156 |
| 2002/0078347 A1 | * | 6/2002 | Hericourt et al. | 713/156 |
| 2002/0169954 A1 | * | 11/2002 | Bandini et al. | 713/153 |
| 2002/0184182 A1 | * | 12/2002 | Kwan | 707/1 |
| 2003/0130947 A1 | * | 7/2003 | Benantar | 705/44 |

OTHER PUBLICATIONS

Adams, C. et al. "Internet X.509 Public Key Infrastructure Certificate Management Protocols", FRC2510, Mar. 1999.*
Boeyen, S. et al. "Internet X.509 Public Key Infrastructure Operational Protocols—LDAPv2", RFC2559, Apr. 1999.*
Housley, R. et al. "Internet X.509 Public Key Infrastructure Operational Protocols: FTP and HTTP", RFC2585, May 1999.*

(Continued)

*Primary Examiner*—Kambiz Zand
*Assistant Examiner*—Michael J. Simitoski
(74) *Attorney, Agent, or Firm*—Lang Michener LLP

(57) ABSTRACT

A system and method for a certificate verifier to make a request to a certificate distribution server for a copy of another entity's digital certificate and to have the certificate distribution center validate it. The certificate distribution center can request the appropriate certificates and validation thereof from a number of certificate authorities or may alternatively obtain copies from a certificate cache and validate the copies against a revocation list server.

22 Claims, 5 Drawing Sheets

OTHER PUBLICATIONS

Malpani, Ambarish et al. "Simple Certificate Validation Protocol (SCVP)", Jul. 2000.*

Menezes, Alfred J. et al. Handbook of Applied Cryptography, 1997 CRC Press LLC, pp. 543-590.*

Myers, M. et al. "X.509 Internet Public Key Infrastructure Online Certificate Status Protocol—OCSP", RFC2560, Jun. 1999.*

Schneier, Bruce. Applied Cryptography, Second Edition, 1996 John Wiley & Sons, Inc., pp. 574-577.*

* cited by examiner

SYSTEM AND METHOD OF LOOKING UP AND VALIDATING A DIGITAL CERTIFICATE IN ONE PASS

PRIORITY CLAIM

The patent application claims priority from Canadian Patent Application No. 2,374,195 filed on Mar. 1, 2002 in the Canadian Patent Office, the contents of which is incorporated herein by reference.

FIELD OF THE INVENTION

This invention relates to the field of digital certificates. More specifically, it is directed to an improved scheme for validating digital certificates.

BACKGROUND OF THE INVENTION

In asymmetric encryption technology, each user generates a pair of keys known as a public key and a private key. The public key is widely disseminated and used by others to encrypt communications intended for the owner of the public key. Once the message has been encrypted with the public key, it can only be decrypted with the corresponding private key. This is the basis of public key encryption.

The problem with this technology is that the sender needs to have a way of guaranteeing that the public key used for encryption does indeed belong to the recipient. Otherwise, the sender could unintentionally encrypt a message that could only be decrypted by some mischievous third party. A method was therefore needed for users to be able to have a high degree of assurance that the owner of a public key was indeed the intended recipient.

Digital certificates were invented to solve this problem. A recognized certificate authority issues a certificate binding the public key of a subscriber to his real world identity. The certificate is digitally signed by the recognized issuing authority. A message is digitally signed in effect by encrypting it with a private key. The message can then only be decrypted with the corresponding public key, and provided the user has a high degree of trust in the certifying authority, he will then have assurance that the public key contained in the certificate does indeed belong to the user to whom it is bound.

Digital certificates generally follow the X.509 standard, developed by the International Standards Organization (ISO) and the Comité Consultatif Internationale Telegraphique et Telephonique (CCITT). These certificates create a binding between an entity's public key and its identity. Obtaining authentic copies of public key certificates is critical in deploying secure public key systems. Often a digital certificate is stored in a publicly accessible repository such as an LDAP or X.500 directory.

In practice, implementers of certificate revocation lists have discovered that they are difficult to manage because they can become very large and not usable by some certificate verifiers such as smartcards or mobile phones. Further, since these lists are issued only periodically, there is a time gap between when a certificate is revoked by its issuer and when it appears on a publicly available list of revoked certificates. Methods such as the online certificate status protocol have been developed as a means to make requests to validation services to determine whether a particular certificate is currently valid, however, this requires that a certificate verifier make at least two requests, one to obtain a copy of the certificate and another to obtain the current validity status of the certificate. Further requests may be required to obtain all certificates needed to construct a certificate chain that can be validated up to a trusted root held by the verifier. In many applications, in particular those where the verifier is a mobile phone, smartcard or other client devices that are relatively constrained with respect to storage capacity, processing power and communication bandwidth, the current solutions are not practical.

It will be apparent from the foregoing that prior certificate issuance and validation systems and methods are generally designed to allow a user to obtain a validated digital certificate, but are slow and cumbersome to the user under various circumstances.

SUMMARY OF THE INVENTION

It is an object of the present invention to provide a system for accessing and validating a digital certificate, comprising a first set of certificate authorities connected to a communication network and able to receive and respond to requests for certificates; the first set of certificate authorities having a set of hierarchical trust relationships among them, the set of hierarchical trust relationships being verified by a set of digital certificates; a certificate holder having a digital certificate issued by one of the first set of certificate authorities; a certificate verifier connected to the communication network and having a trust relationship with a second set of certificate authorities; and a certificate distribution center connected to the communication network and operable to receive a request from the certificate verifier for a validated copy of the digital certificate, obtain the digital certificate from said one of the first set of certificate authorities, obtain a subset of digital certificates of the set of digital certificates necessary to validate the digital certificate, and return to the certificate verifier a validated copy of the digital certificate, wherein the certificate distribution server determines the subset of digital certificates of the set of digital certificates based on the second set of certificate authorities.

Preferably, the certificate distribution center is operable to indicate to the certificate verifier that the digital certificate has a status of invalid, revoked, expired or non-existent.

Also preferably, there is at least one revocation list server having a list of digital certificates that have been revoked; and a certificate cache, wherein the certificate distribution center additionally obtains from the certificate cache a cached copy of one of the digital certificate and the set of digital certificates and verifies with the at least one revocation server the validity thereof prior to contacting the set of certificate authorities.

The certificate cache preferably resides at the certificate distribution center and serves a plurality of certificate verifiers.

Also preferably, the certificate distribution center deposits a subset of the digital certificate and the subset of digital certificates obtained from the first set of certificate authorities in the certificate cache.

The request from the certificate verifier can indicate a desired level of confidence for the digital certificate's validity or can directs the certificate distribution center to ignore the certificate cache.

Preferably, the reply to the certificate verifier additionally comprises a formatted first certificate chain summary.

Also preferably, the certificate distribution center additionally constructs and returns a second certificate chain, based on the second set of certificate authorities, to the certificate verifier permitting the certificate verifier to validate the digital certificate of the certificate distribution center.

The certificate distribution center preferably has prior knowledge of the second set of certificate authorities trusted by the certificate verifier.

In addition, the request from the certificate verifier includes a requested certificate identifier from which each of the first set of certificate authorities in parent relationship to the certificate holder can be identified.

In another aspect of the invention, there is provided a method of validating and serving a digital certificate, comprising the steps of receiving a first request from a certificate verifier for a digital certificate; sending a second request to a first certificate authority having issued the digital certificate requested by the certificate verifier; receiving the digital certificate from the first certificate authority; if the first certificate authority is not trusted by the certificate verifier, requesting an additional digital certificate from a subsequent parent certificate authority, receiving the additional digital certificate from the subsequent parent certificate authority, validating a previous digital certificate with the additional digital certificate, and, in the event that said subsequent parent certificate authority is not trusted by the certificate verifier, repeating these steps; and returning the digital certificate to the certificate verifier.

Preferably, the step of receiving the digital certificate or additional digital certificate from the certificate authority can alternatively comprise receiving an indication that the digital certificate or the additional digital certificate is invalid, the steps of obtaining additional digital certificates are repeated also conditionally on the validity of the previous digital certificate and the existence of the additional digital certificate and its unrevoked status, and the step of returning the digital certificate to the certificate verifier can alternatively comprise returning a notification that the digital certificate is invalid.

Also preferably, the method additionally comprises the step of obtaining the digital certificate or the additional digital certificate from a certificate cache and validating the digital certificate or the additional digital certificate using a revocation list in place of obtaining the digital certificate or the additional digital certificate from the first or subsequent parent certificate authorities, in the event that the digital certificate or the additional digital certificate is available from the certificate cache.

Further, the method preferably additionally comprises the step of placing at least one of the digital certificate and the additional digital certificates in the certificate cache once received from the first or subsequent parent certificate authority.

The step of receiving a first request from a certificate verifier can additionally comprise receiving a desired level of confidence from the certificate verifier, and the step of validating the digital certificate and the additional digital certificates reflects the desired level of confidence.

Alternatively, the step of receiving a first request from a certificate verifier comprises receiving from the certificate verifier a direction to ignore the certificate cache.

Further, the step of returning the digital certificate to the certificate verifier preferably additionally comprises constructing a first certificate chain from the digital certificate and the additional digital certificates, if any, and returning the first certificate chain, along with the digital certificate, to the certificate verifier.

Preferably, the step of returning the certificate chain comprises formatting the first certificate chain and the digital certificate prior to returning the first certificate chain to the certificate verifier.

The steps of obtaining additional digital certificates are preferably followed by the step of constructing a second certificate chain, based on the second set of certificate authorities, to the certificate verifier permitting the certificate verifier to validate the certificate distribution center, and returning the second certificate chain to the certificate verifier.

Preferably, the step of constructing a second certificate chain additionally comprises the step of formatting the second certificate chain prior to returning the second certificate chain to the certificate verifier.

Also preferably, the step of receiving a first request from a certificate verifier for a digital certificate additionally includes the step of identifying the first certificate authority and each of the subsequent parent certificate authorities solely from the information presented in the first request, and the steps of obtaining the additional digital certificates is performed prior to receiving the digital certificate from the first certificate authority.

BRIEF DESCRIPTION OF THE DRAWINGS

The present invention will now be described, by way of example only, with reference to certain embodiments shown in the attached Figures in which.

DETAILED DESCRIPTION OF THE INVENTION

Figure 1:
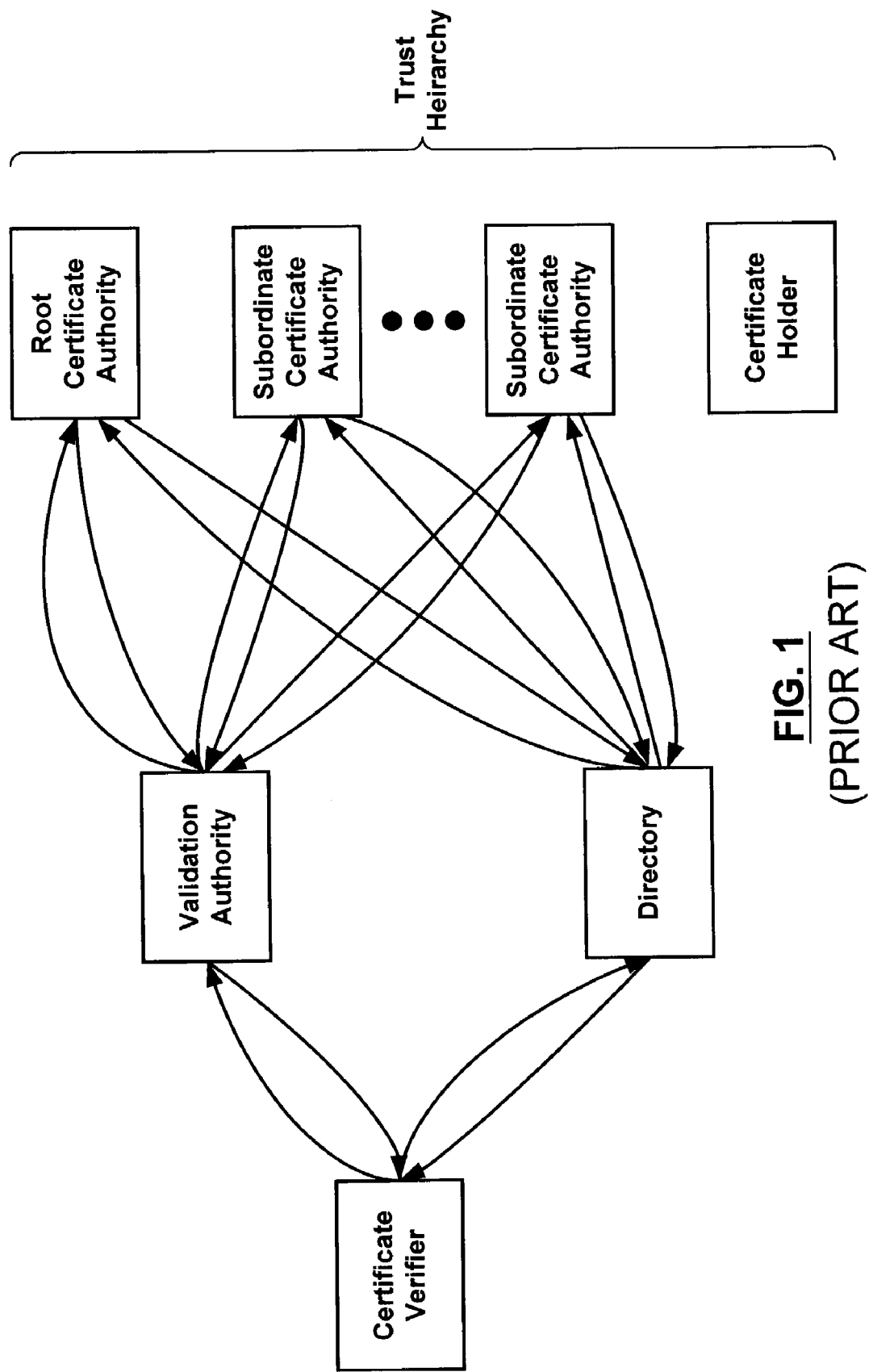
FIG. 1 is a block diagram of the prior art method of authenticating the public key of an entity.
Figure 2:
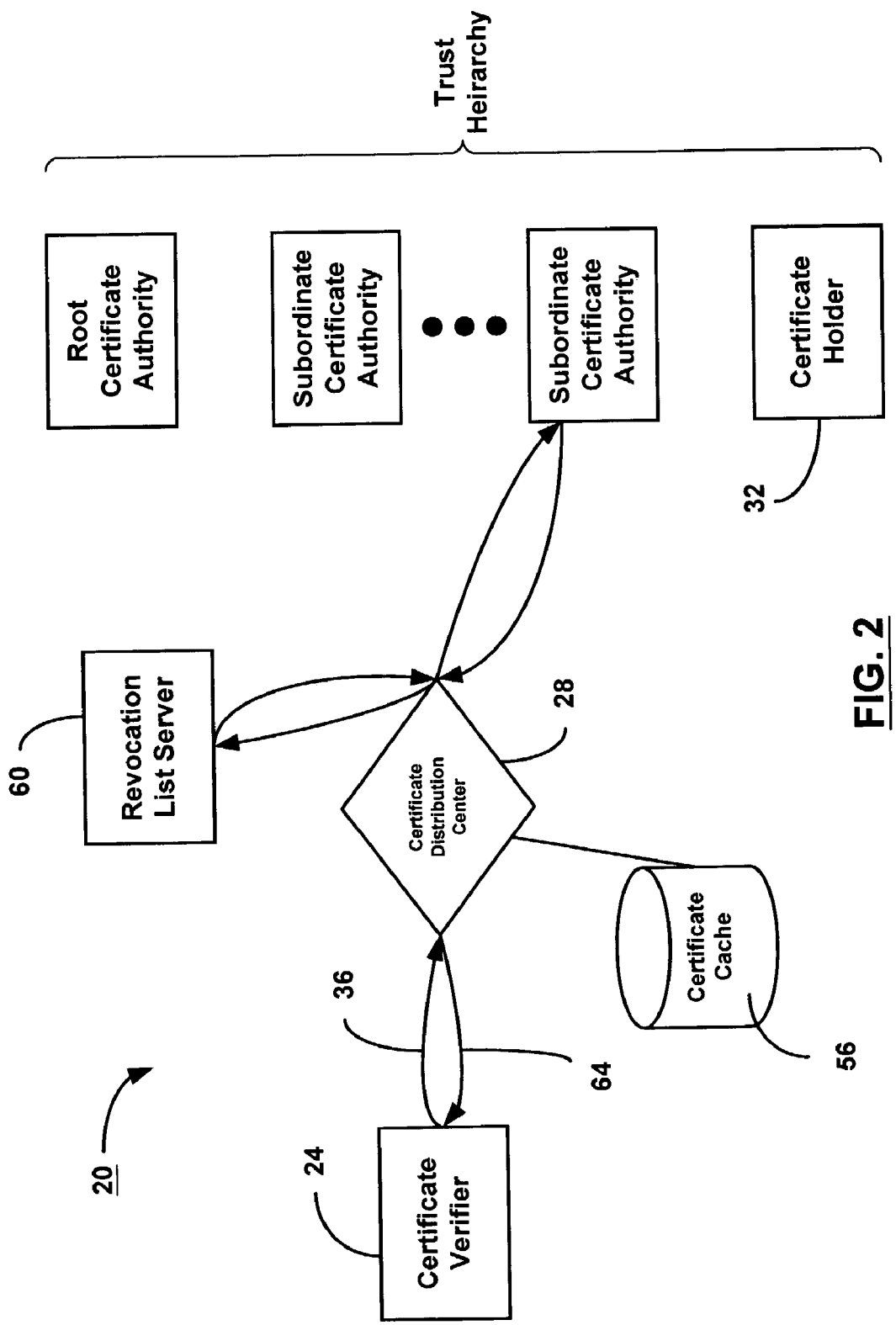
FIG. 2 is a block diagram of the method in an embodiment in the present invention for authenticating the public key of an entity.
Figure 3:
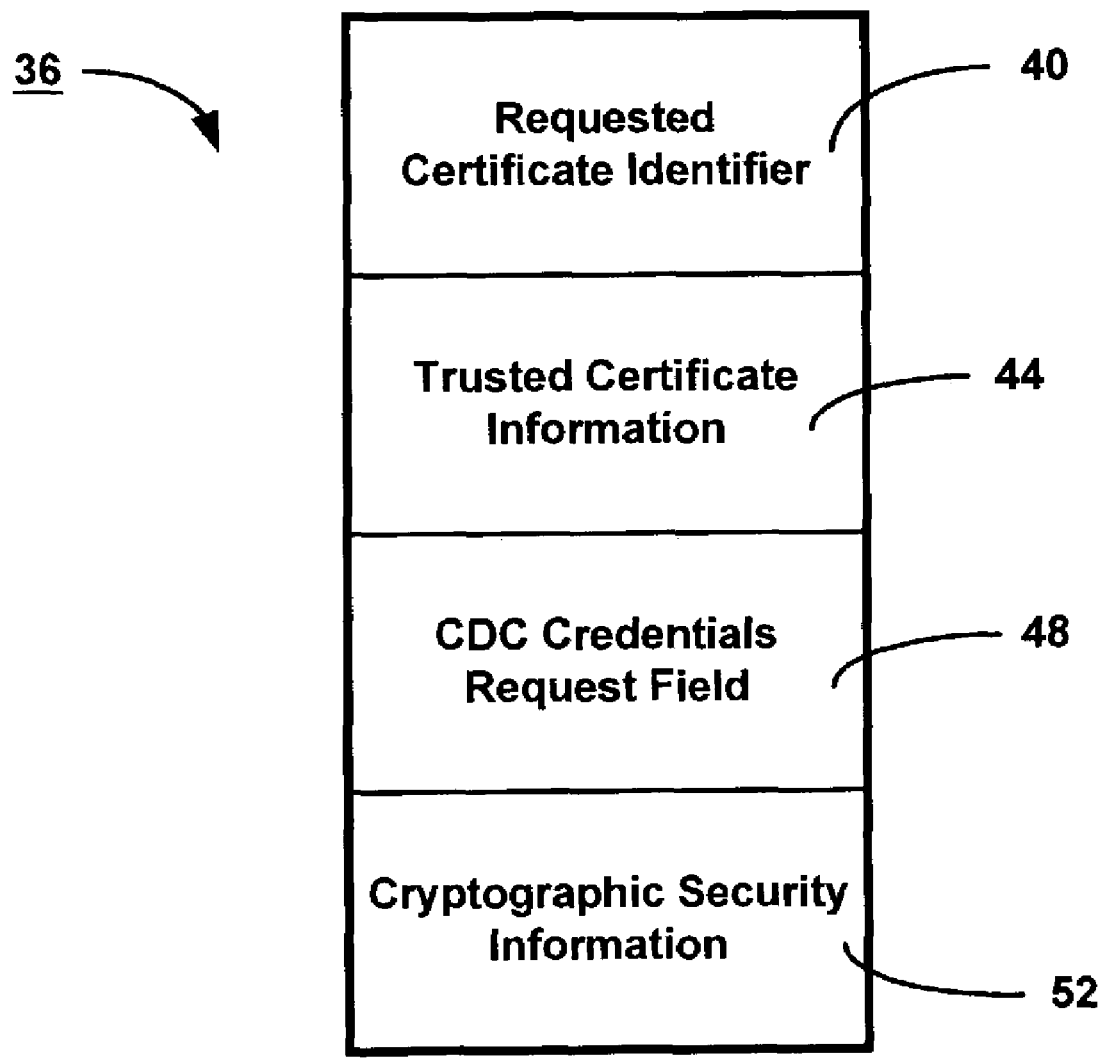
FIG. 3 is a block diagram of the request data structure sent by the certificate verifier to a certificate distribution center in a present embodiment of the invention.
Figure 4:
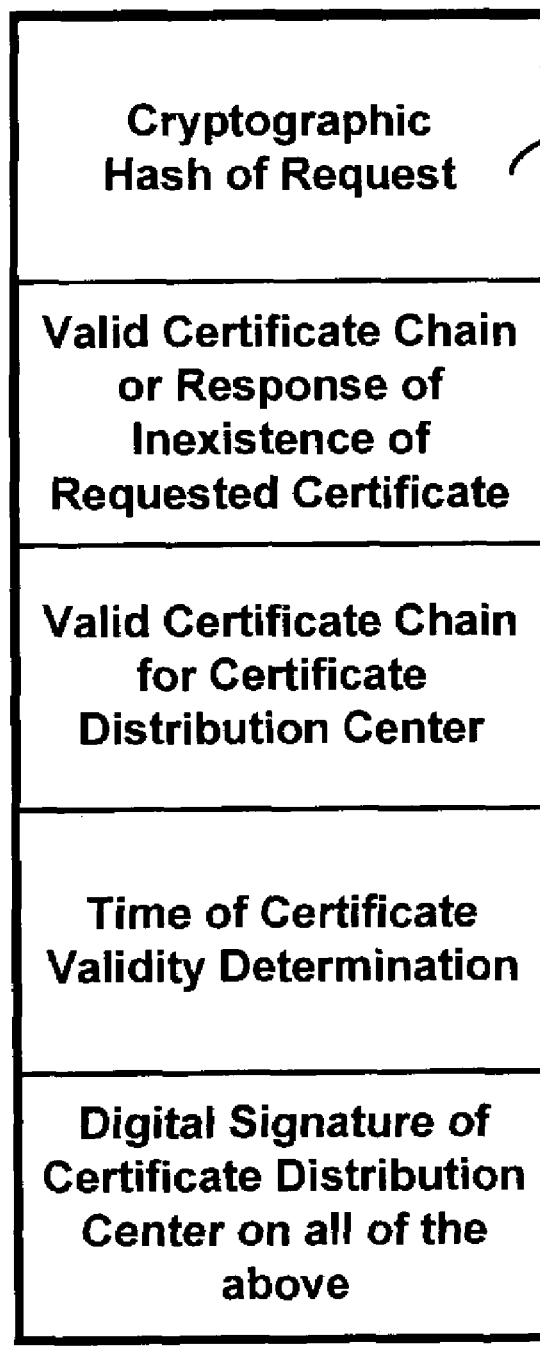
FIG. 4 is a block diagram of the response data structure sent by the certificate distribution center to the certificate verifier in a present embodiment of the invention.
Figure 5:
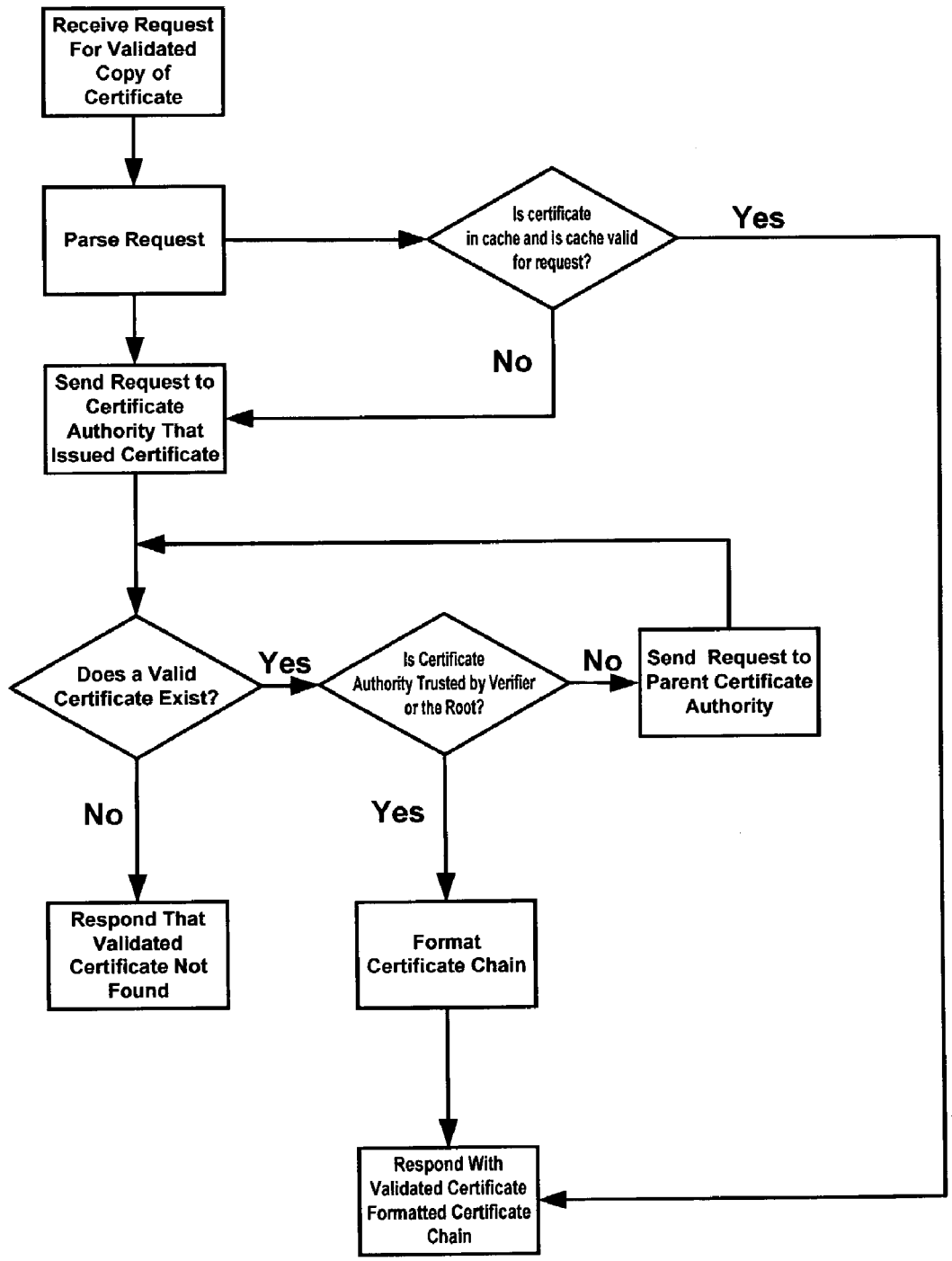
FIG. 5 is a flow chart of an embodiment of the method of looking up and validating a digital signature in one pass.

The general method of certificate authentication as taught under the aforementioned standards is shown in FIG. 1. In order to obtain a validated certificate, a verifier may be required to make numerous requests to various authorities and verify the authenticity of each certificate received individually.

Referring now to FIGS. 2 to 5, the system and method of looking up and validating a digital certificate in one pass in accordance with a first embodiment of the present invention is indicated generally at 20. A certificate verifier 24 is provisioned with at least one certificate of a trusted root certificate authority and means to locate and contact a certificate distribution center (CDC) 28. Certificate verifier 24 may be a desktop or server computer that has a permanent connection or establishes a temporary connection to a communication network, such as the Internet. Certificate verifier 24 may know the physical address of CDC 28 or may know its virtual address that will resolve to CDC 28 by means of a resolution system, such as DNS.

When certificate verifier 24 needs to obtain a copy of a public key contained in a certificate, and wants assurances that the certificate is currently valid, in order to verify a digital signature of or encrypt a message to a certificate holder 32, it transmits a certificate request 36 to CDC 28.

Certificate request 36 contains a requested certificate identifier 40 that provides sufficient information for CDC 28 to retrieve the certificate for certificate holder 32 from the appropriate CA. Requested certificate identifier 40 may be information that directly or indirectly identifies certificate holder 32.

Certificate request 36 can also contain trusted certificate information 44, indicating trust relationships with at least one CA. Trusted certificate information 44 defines the gap in trust that CDC 28 must try to bridge with a chain of certificates. Trusted certificate information 44 can be a list of the CAs for which trusted certificates are held, a reference to a list of CAs known or available to CDC 28, or any other information allowing CDC 28 to determine what CAs are trusted by certificate verifier 24.

Additionally, validated certificate request 36 can optionally contain a CDC credentials request field 48 that allows certificate verifier 24 to demand a copy of the certificate of CDC 28 and, additionally, any certificates required to construct a chain to a CA trusted by certificate verifier 24.

Further, a set of cryptographic security information 52 can be included in validated certificate request 36 to prevent a replay attack such as a time code or a nonce.

CDC 28 receives validated certificate request 36 and parses it. The initial task of CDC 28 is to use cryptographic security information 52 to verify whether the request was tampered with.

Once verified, CDC 28 commences acquiring and validating the appropriate certificates. The greatest resources used in constructing a response are in looking up the certificate chain of certificate holder 32 and validity thereof. CDC 28 may need to lookup these certificates in public directories such as LDAP or X.500 directories. CDC 28 looks up the certificate of certificate holder 32, the certificates of the CA that issued the certificate of certificate holder 32 and the certificates of the subsequent parent CAs that demonstrate the hierarchical trust relationships, up to the certificate issued by the CA trusted by certificate verifier 24. If the CAs trusted by certificate verifier 24 are not a direct or indirect parent of the CA that issued the certificate to certificate holder 32, then CDC 28 can continue to look up certificates until that of the root CA has been obtained.

CDC 28 can maintain a certificate cache 56 to cache certificates retrieved in response to certificate requests 36. In this case, CDC 28 preferably serves multiple certificate verifiers. Alternatively, certificate cache 56 may be externally located.

For each certificate required, CDC 28 checks to see if a cached copy exists in certificate cache 56. If it does, CA checks with a revocation list server 60 maintaining a list of revoked certificates that is updated periodically. Revocation list server 60 can be located at CDC 28, such as a process on the same computer making the request or on a separate computer cooperatively comprising CDC 28, or can alternatively be located externally. Alternatively, CDC 28 checks with the CA that issued the certificate to confirm the validity of the certificate.

If CDC 28 does not have access to a cached copy of a required certificate, CDC 28 contacts the CA that issued the certificate for a copy, if available.

CDC 28 can thus construct a chain of certificates from certificate holder 32 to a CA trusted by certificate verifier 24, or to a root CA if no CA in the hierarchy is trusted by certificate verifier 24.

Where CDC credentials request field 48 is employed and certificate verifier 24 has requested such credentials, CDC 28 can construct a chain of certificates from CDC 28 to a CA trusted by certificate verifier 24, or to a root CA if no CA in the hierarchy is trusted by certificate verifier 24.

CDC 28 then forms and transmits a certificate response 64 to certificate verifier 24. Certificate response 64 can include a cryptographic hash of the original request for purposes of verifying secure receipt of certificate request 36 of certificate verifier 24.

If CDC 28 was able to find a valid certificate matching the requested parameters, it can include in certificate response 64 the certificate and certificate chain information up to, but not including, the certificate of a trusted certificate authority specified in the request 36, or the root CA where no CA trusted by certificate verifier 24 was in the chain. Alternatively, CDC 28 can provide a confirmation of the credentials of certificate holder 32 in some other format, such as a Boolean response.

If no certificate matches the requested parameters or if the requested certificate is revoked, has expired or is invalid because of an incomplete certificate chain to a trusted certificate authority, CDC 28 sends a response indicating that no such valid certificate was found.

Where certificate verifier 24 requests the credentials of CDC 28, CDC 28 can provide its certificate and certificate chain information up to, but not including, the certificate of a trusted root specified in the request.

If certificate verifier does not have a trusted root that is in a chain containing the requested certificate or a chain containing the certificate distribution center's certificate, CDC 28 may include this trusted root but the response may be less meaningful to the certificate verifier.

The time at which CDC 28 determined the validity of the requested certificate can be optionally included in the response.

Finally, CDC 28 includes its digital signature on the response covering the entire contents of the response.

CDC 28 sends signed certificate response 64 to certificate verifier 24.

Certificate verifier 24 uses the public key of CDC 28 to verify the signature on certificate response 64. This key is obtained either from certificate response 64 itself or by some other method. Certificate verifier 24, if it does not trust this key directly, also verifies the certificate chain containing this certificate, and resultantly this key, up to a trusted certificate. Certificate verifier 24 also verifies that the identity in the certificate returned in certificate response 64 containing the public key of CDC 28 matches the identity of CDC 28.

Certificate verifier 24 also verifies that the cryptographic hash 52 of certificate request 64 it sent to CDC 28 matches the cryptographic hash 68 in the response. This prevents replay attacks and prevents an adversary from changing the information in the original request.

Once certificate verifier 24 has determined that certificate response 64 is authentic and is a response to the request it made, it can proceed to extract the requested certificate and certificate chain information with the confidence that each certificate in the chain is currently valid and not revoked.

While the foregoing description refers to a system whereby the response includes the certificate chain and validation thereof, it is contemplated that CDC 28 returns a response indicating that the certificate chain has been validated, but does not include the certificate chain itself.

Other variations are within the scope of the invention. For example, CDC 28 can have a certificate issued by a CA trusted directly or indirectly by certificate verifier 24; for example, the CA whose root certificate is held by certificate verifier 24. This enables certificate verifier 24 to trust CDC 28.

Further, the certificate of CDC 28 can indicate that CDC 28 is permitted to act in its capacity.

CDC 28 can maintain state information about which certificate authorities are trusted by certificate verifier 24.

Certificate verifier 24 can specify a desired level of confidence to be satisfied in determining the validity of a requested digital certificate. For example, certificate verifier may specify that a certificate obtained from a source other than the issuing certificate authority only need have been validated within the last month; that is, if the certificate was placed in the cache in the last month or was determined not to have been on a revocation list in the last month, then the certificate can be relied on. Further, certificate verifier 24 can specify for CDC 28 to obtain fresh copies of certificates from the appropriate issuing certificate authorities.

Requested certificate identifier 40 can disclose not only the name and location of the digital certificate of certificate holder 32, but may also specify those of each subsequent parent certificate authority including the root certificate authority, such as by using the method of pseudonyms for identifying certificate chains, as disclosed in co-pending Canadian patent application 2,365,441. If the method described in co-pending Canadian patent application 2,365, 441. is used, then information contained in the response may contain a certificate sequence number.

Further, where the complete hierarchy can be immediately identified from requested certificate identifier 40 of certificate request 36, CDC 28 can perform the necessary procedures to validate each of the certificate in the certificate chain simultaneously, thus improving response times.

The present invention provides a novel system and method for looking up and validating a digital certificate that is generally less cumbersome and more rapid for the certificate verifier.

The invention enables client software to have a smaller size because certificate validation information is gathered and consolidated by the certificate distribution center. The set up of this software is easier because it needs to be configured to communicate only with the certificate distribution center. Network communications are more efficient because the certificate verifier does not need to establish sessions with different validation authorities or directories.

The above-described embodiments of the invention are intended to be examples of the present invention and alterations and modifications may be effected thereto, by those of skill in the art.

This concludes the description of the preferred embodiment of the invention. The foregoing description has been presented for the purpose of illustration and is not intended to be exhaustive or to limit the invention to the precise form disclosed. Many modifications and variations are possible in light of the above teaching and will be apparent to those skilled in the art. It is intended the scope of the invention be limited not by this description but by the claims that follow.

We claim:

1. A system for accessing and validating a digital certificate, comprising:
   a first set of certificate authorities connected to a communication network and operative to receive and respond to requests for certificates;
   said first set of certificate authorities having a set of hierarchical trust relationships among them, said set of hierarchical trust relationships being verified by a set of hierarchical trust digital certificates;
   a certificate holder having a digital certificate issued by one of said first set of certificate authorities;
   a certificate verifier connected to said communication network and having a trust relationship with a second set of certificate authorities; and
   a certificate distribution center connected to said communication network and operable to receive a request from said certificate verifier for a validated copy of said digital certificate, obtain said digital certificate from said one of said first set of certificate authorities, obtain a subset of digital certificates of said set of digital certificates necessary to validate said digital certificate, and return to said certificate verifier a validated copy of said digital certificate,
   at least one revocation list server having a list of digital certificates that have been revoked; and
   a certificate cache,
   wherein said certificate distribution center additionally obtains from said certificate cache a cached copy of one of said digital certificate and said set of hierarchical trust digital certificates and verifies with said at least one revocation server the validity thereof prior to contacting said second set of certificate authorities;
   wherein said certificate distribution center determines said subset of digital certificates of said set of digital certificates based on said second set of certificate authorities.

2. The system for accessing and validating a digital certificate of claim 1, wherein said certificate distribution center is operable to indicate to said certificate verifier that said digital certificate has a status chosen from the group consisting of one or more of: invalid, revoked, expired or non-existent.

3. The system for accessing and validating a digital certificate of claim 1, wherein said certificate cache resides at said certificate distribution center.

4. The system for accessing and validating a digital certificate of claim 1, wherein said certificate cache serves a plurality of certificate verifiers.

5. The system for accessing and validating a digital certificate of claim 1, wherein said certificate distribution center deposits a subset of said digital certificate and said subset of digital certificates obtained from said first set of certificate authorities in said certificate cache.

6. The system for accessing and validating a digital certificate of claim 1, wherein said request from said certificate verifier indicates a desired level of confidence for said digital certificate's validity.

7. The system for accessing and validating a digital certificate of claim 1, wherein said request from said certificate verifier directs said certificate distribution center to ignore said certificate cache.

8. The system for accessing and validating a digital certificate of claim 1, wherein said digital certificate returned to said certificate verifier additionally comprises a formatted first certificate chain summary.

9. The system for accessing and validating a digital certificate of claim 1, wherein said digital certificate returned to said certificate verifier additionally comprises each of said subset of said set of digital certificates obtained from said first set of certificate authorities.

10. The system for accessing and validating a digital certificate of claim 1, wherein said certificate distribution center additionally constructs and returns a second certificate chain, based on said second set of certificate authorities, to said certificate verifier permitting said certificate verifier to validate said digital certificate of said certificate distribution center.

11. The system for accessing and validating a digital certificate of claim 1, wherein said certificate distribution center has knowledge of said second set of certificate authorities trusted by said certificate verifier.

12. The system for accessing and validating a digital certificate of claim 1, wherein said request from said certificate verifier includes a requested certificate identifier which identifies each of said first set of certificate authorities in parent relationship to said certificate holder.

13. A method of validating and serving a digital certificate, comprising the steps of:
   (a) receiving a first request from a certificate verifier for a digital certificate;
   (b) sending a second request to a first certificate authority having issued said digital certificate requested by said certificate verifier;
   (c) receiving said digital certificate from a certificate cache, and validating the digital certificate received from the certificate cache using a revocation list, and if said digital certificate is not in said certificate cache or is determined to be invalid, receiving the certificate from said first certificate authority;
   (d) if said first certificate authority is not trusted by said certificate verifier:
      (i) requesting an additional digital certificate from a subsequent parent certificate authority of said first certificate authority;
      (ii) receiving said additional digital certificate from a certificate cache, and validating the digital certificate received from the certificate cache using a revocation list, and if said additional digital certificate is not in said certificate cache or is determined to be invalid, receiving the additional digital certificate from said subsequent parent certificate authority;
      (iii) validating a previous digital certificate with said additional digital certificate; and
      (iv) in the event that said subsequent parent certificate authority is not trusted by said certificate verifier, repeating steps (i) to (iii) as necessary; and
   (e) returning said digital certificate as requested in step (a) to said certificate verifier.

14. The method of validating and serving a digital certificate of claim 13, wherein steps (c) and (d)(ii) further include receiving, if invalid, an indication that said digital certificate or said additional digital certificate is invalid, step (d)(iv) further includes providing an indication that said previous digital certificate is validated and said additional digital certificate exists and was not revoked, and step (e) further includes returning a notification that said digital certificate is invalid in lieu of said digital certificate if said digital certificate is invalid.

15. The method of validating and serving a digital certificate of claim 13, additionally comprising the step of placing at least one of said digital certificate and said additional digital certificates in said certificate cache once received from said first or subsequent parent certificate authority.

16. The method of validating and serving a digital certificate of claim 13, wherein step (a) additionally comprises receiving a desired level of confidence from said certificate verifier, and the step of validating said digital certificate and said additional digital certificates reflects said desired level of confidence.

17. The method of validating and serving a digital certificate of claim 13, wherein step (a) additionally comprises receiving from said certificate verifier a direction to ignore any certificate cache and skip all steps (c) and (d)(ii) related to said certificate cache.

18. The method of validating and serving a digital certificate of claim 13, wherein step (e) additionally comprises constructing a first certificate chain from said digital certificate and said additional digital certificates, if any, and returning said first certificate chain, along with said digital certificate, to said certificate verifier.

19. The method of validating and serving a digital certificate of claim 18, wherein step (e) additionally comprises formatting said first certificate chain and said digital certificate prior to returning said first certificate chain to said certificate verifier.

20. The method of validating and serving a digital certificate of claim 13, additionally comprising the step of;
   (f) following step (d), constructing a second certificate chain, based on said second set of certificate authorities, to said certificate verifier permitting said certificate verifier to validate said certificate distribution center, and returning said second certificate chain to said certificate verifier.

21. The method of validating and serving a digital certificate of claim 20, additionally comprising the step of formatting said second certificate chain prior to returning said second certificate chain to said certificate verifier.

22. The method of validating and serving a digital certificate of claim 13, wherein said first request in step (a) identifies said first certificate authority and each of said subsequent parent certificate authorities, and step (d)(i) is performed prior to receiving said digital certificate from said first certificate authority in step (c).

* * * * *